United States Patent [19]

Roncaglione et al.

[11] Patent Number: 4,495,667
[45] Date of Patent: Jan. 29, 1985

[54] VEHICLE WASHING APPARATUS

[75] Inventors: James W. Roncaglione, Vienna; Daniel E. Roncaglione, Chatham, both of Va.

[73] Assignee: Caravelle Industries, Inc., Manassas, Va.

[21] Appl. No.: 458,099

[22] Filed: Jan. 14, 1983

[51] Int. Cl.³ .............................................. B60S 3/06
[52] U.S. Cl. ................................ 15/53 A; 15/DIG. 2
[58] Field of Search ............ 15/53 A, 53 AB, DIG. 2

[56] References Cited

U.S. PATENT DOCUMENTS 3,662,418  5/1972  Kamiya .............................. 15/53 A
3,688,329  9/1972  Capra ................................. 15/53 A
3,725,967  4/1973  Capra ................................. 15/53 A

FOREIGN PATENT DOCUMENTS 2824674  10/1979  Fed. Rep. of Germany ... 15/DIG. 2
1442349   7/1976  United Kingdom ........... 15/DIG. 2

Primary Examiner—Edward L. Roberts
Attorney, Agent, or Firm—Birch, Stewart, Kolasch & Birch

[57] ABSTRACT

A vehicle washing apparatus is disclosed which systematically regulates the cleaning operation to produce optimum results. The apparatus comprises a frame member having an opening to receive the vehicle with means provided to move one of said frame member and vehicle relative to each other. A horizontal cleaning brush is rotatably disposed within the frame member. A brush control system is provided for regulating the positioning of the brush relative to the vehicle during the cleaning cycle.

3 Claims, 2 Drawing Figures

VEHICLE WASHING APPARATUS

The present invention relates to a vehicle washing apparatus which, together with a sensing device, systematically regulates a cleaning brush in contact with the vehicle so as to produce optimum cleaning results.

Automatic vehicle washers which utilize brushes that are rotatable about a horizontal axis are well known and are widely used in the car wash industry. The brush is generally mounted horizontally so as to move vertically within guides of a gantry and the brush is free to swing on the beforesaid mount. The brush is lowered to the lowermost portion of the gantry and then proceeds to move forward with the gantry until contact is made with the object to be cleaned. As the rotating brush contacts and cleans the vehicle, it must constantly be adjusted so as to maintain a proper contact pressure relationship with the object being cleaned, while maintaining a constant brush rotational speed. To this end, prior art apparatuses have provided support chains for the brush which are engaged in response to a sensing device so as to physically elevate or lower the brush so as to adjust the brush with respect to the vehicle as the cleaning process proceeds. Such a system is not without its disadvantages, specifically with respect to the manner in which the brush position is changed, with reliance being placed upon the brush being supported by the beforementioned chain mechanism. If, as has often been experienced, the support mechanism fails, the brush will come crashing down upon the vehicle being washed, thus creating an obviously unsatisfactory condition. Thus, it is desirable to provide a brush control system which will eliminate the possibility of damage to the vehicle being cleaned.

SUMMARY OF THE INVENTION

Therefore, it is an object of the present invention to provide a vehicle washing apparatus which will overcome the above-noted and other disadvantages.

It is a further object of the present invention to provide a vehicle washing apparatus which utilizes a horizontal brush having an improved monitoring system which controls the contact pressure between the brush and the vehicle being cleaned.

A further object of the present invention is to provide a vehicle washing apparatus which incorporates a current sensing device in combination with an air clutch assembly coupled with a cable supported counterbalanced horizontal brush for adjusting the pressure contact of the brush with the vehicle while eliminating the possibility of mechnical failure in the elevation and lowering of the brush, thereby avoiding potential hazardous circumstances.

Yet, still another object of the present invention is to provide a novel relationship whereby the cleaning brush of the instant apparatus can effectively be adjusted relative to the vehicle while eliminating potentially unsafe situations.

The foregoing objects and others are accomplished in accordance with the present invention, generally speaking, by providing a vehicle washing apparatus which includes a frame structure having an opening adapted to receive a vehicle to be washed, means for causing relative movement between the frame member and the vehicle and a horizontally opositioned brush rotatably disposed within the frame member by a counterweighted brush mount assembly with the horizontal brush being freely supported within vertical side supports. The brush mount moves vertically within the side or leg portions of the frame member or gantry and the brush may either be fixed or free to swing on the mount. The brush mount is equipped with a motor to turn the brush in a conventional manner. The brush is lowered to the base of the frame member or gantry upon initiation of the cleaning cycle at which time a mechanism is activated so as to move the gantry relative to the vehicle so as to bring the rotating brush in contact therewith. In the alternative, the frame member or gantry remains stationary and the vehicle moves relative to the gantry. So as to maintain a constant rotational speed of the cleaning brush and proper pressure relationship between the brush and the vehicle, a brush control system is provided whereby a sensing device interacts with an air clutch-transmission assembly which, upon engagement, adjusts the brush so as to maintain the proper pressure contact between the brush and the vehicle. The brush, through the entire operation, is supported by the cable-counterweight attachment which continuously maintains the brush in a floating relationship with respect to the vehicle being cleaned. This means that the brush is slightly heavier, e.g., 15 pounds, than the counterweight and, thus, "floats" relative to the vehicle when the brush control system is not functioning to physically displace the brush mount assembly in an upward direction.

As stated above, the cleaning operation may be conducted in two separate modes. In one operation, the vehicle to be washed pulls up to the vehicle washing apparatus and stops. An automatic sensor senses the presence of the vehicle and initiates the wash cycle of the apparatus. The horizontally suspended counterweighted brush mount assembly, initially held in an up position at the top of the frame member or gantry, descends or floats downwardly with the brush being provided with a counterweight such that the brush descends in a controlled manner within the vertical legs or side supports of the gantry to a lower defined position in front of the vehicle. When the brush reaches a predetermined position in the lower portion of the gantry, the gantry motor is activated which moves the apparatus or frame forward relative to the vehicle along the length thereof with the brush engaging the front portion of the vehicle. When the brush contacts the vehicle, resistance to the rotation of the brush is increased so as to slow down the revolutions of the brush. In order to maintain a constant rotational speed, the current is automatically increased to the motor which rotates the brush with the increase in amperage being sensed by a sensing device which sends a signal to a wash cycle control system which automatically stops the gantry while simultaneously engaging the brush control system for regulating the positioning of the cleaning brush. A means is provided, such as an air clutch or brake, for engaging a motor and transmission which, in turn, drives a device which lifts the cleaning brush to a point where the resistance decreases along with the current demand. The return of the current to an initially predetermined value sends a signal to the wash cycle control system which brings about a disengagement of the air clutch means which interrupts further elevation of the brush and reactivates the gantry motor which continues the gantry in its wash cycle movement relative to the vehicle. As the cleaning brush moves along in its cleaning mode, at each point of resistance, the entire brush positioning cycle is repeated until the frame, including the brush, completely traverses the entire length of the vehicle and the brush no longer engages the vehicle. When the horizontal brush descends at the terminal stage of the cleaning cycle, it will engage a limit switch which then reverses the operation whereby the frame member or gantry moves from the rear of the vehicle to the front of the vehicle, rinsing as it traverses the length of the vehicle in the reverse direction, until the frame member returns to the initial position.

In a second embodiment of the cleaning operation, the vehicle to be washed pulls up to the washing apparatus and stops. An automatic sensor senses the presence of the vehicle and automatically starts the wash cycle of the apparatus. The horizontally suspended counterbalanced brush mount assembly, initially held in an up position to provide for "drive thru" exit of the vehicle, descends or floats downwardly in the manner described above. The brush will descend to the lowermost portion possible within the legs of the gantry or, in the alternative, can be regulated to stop, automatically or manually, at any position in between the upper and lower extremities of the lateral supports. The vehicle is then driven or directed into the horizontal brush, moving forward relative to the frame assembly or gantry with the brush engaging the front of the vehicle. As in the first embodiment, when the brush contacts the vehicle, resistance to the rotation of the brush is increased so as to slow down the revolutions per minute (rpm) of the brush. So as to maintain a constant speed, the current to the motor rotating the brush is increased. The increase in current is sensed and a signal is automatically sent to the brush control system which comprises a motor and transmission assembly, a device such as a chain mechanism for altering the position of the brush and a means for engaging the chain mechanism to the motor and transmission assembly, such as the air brake or air clutch. When the air brake locks, it engages the transmission to the chain and lifts the brush mount accordingly until the sensing device detects a reduction in current to the originally predetermined value. At this instant, the air brake means is disengaged and the related motor stopped. The cleaning brush thus floats or settles back into contact with the vehicle as the cleaning process continues. As the vehicle moves under the cleaning brush, at each position of resistance, the entire cycle described above with respect to the brush adjustment is repeated until the entire vehicle has passed under the horizontal cleaning brush. As the vehicle slowly moves past the horizontal brush assembly, the brush will descend washing the rear of the vehicle as it does so. As the brush reaches its lowest position, it will trip a limit switch and stop the operation automatically.

BRIEF DESCRIPTION OF THE DRAWINGS

Other objects and advantages of the invention will become apparent from a study of the following detailed description and drawing wherein.

DETAILED DESCRIPTION OF THE INVENTION

Figure 1:
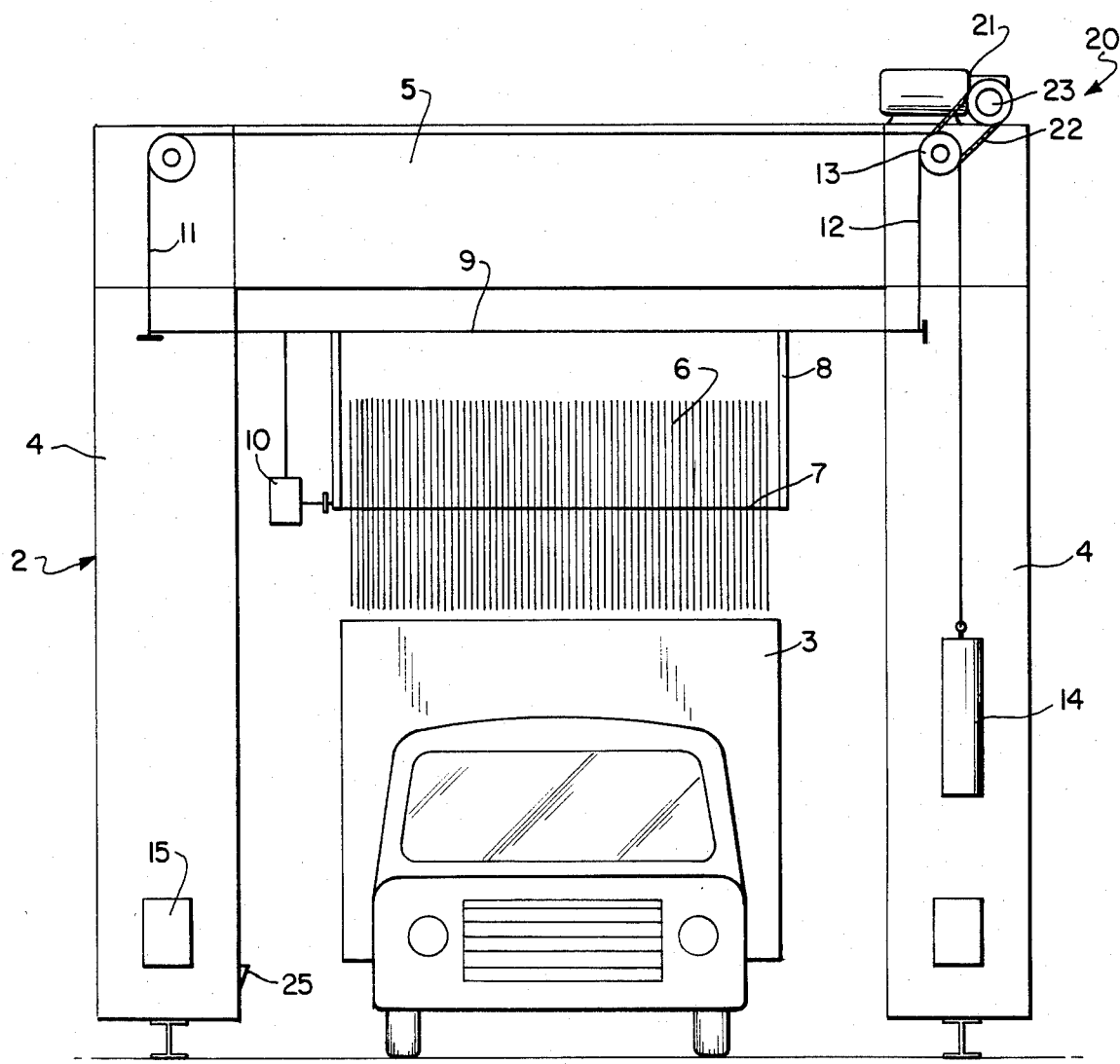
FIG. 1 represents a front elevational view of the vehicle washing apparatus of the present invention with the horizontal brush in its up position before the vehicle washing cycle has begun.

As shown in FIG. 1, the vehicle washing apparatus of the present invention includes a frame member or gantry 2 having an opening therein adapted to receive the vehicle 3. The frame member 2 includes a pair of generally vertical side portions or legs 4 disposed on either side of the vehicle connected by a horizontal top portion 5. A rotatable horizontal brush 6 which rotates about an axis 7 is attached or pivotally mounted by way of arms 8 to a brush mount 9 such that the brush mount moves vertically in guides provided in the legs 4 of the gantry 2 and the brush 6 is represented here as being free to swing on the mount 9 by way of the pivotally mounted or attached arms 8. The brush mount is equipped with a motor 10 to rotate the brush in a conventional manner. The brush mount 9 is supported by respective cables 11 and 12 which pass over an idler pulley 13 whose axis is fixed to the horizontal member 5 of the support frame or gantry 2. The ends of the cables are attached to a single adjustable counterweight 14 housed by the support frame assembly. An operational brush control mechanism, generally designated 20, which comprises a gear box (transmission) and motor 21, chain 22 for turning the pulley 13 so as to lift the brush and a means for engaging the lifting device to the gear box or transmission such as an air activated clutch 23, is provided where indicated.

Figure 2:
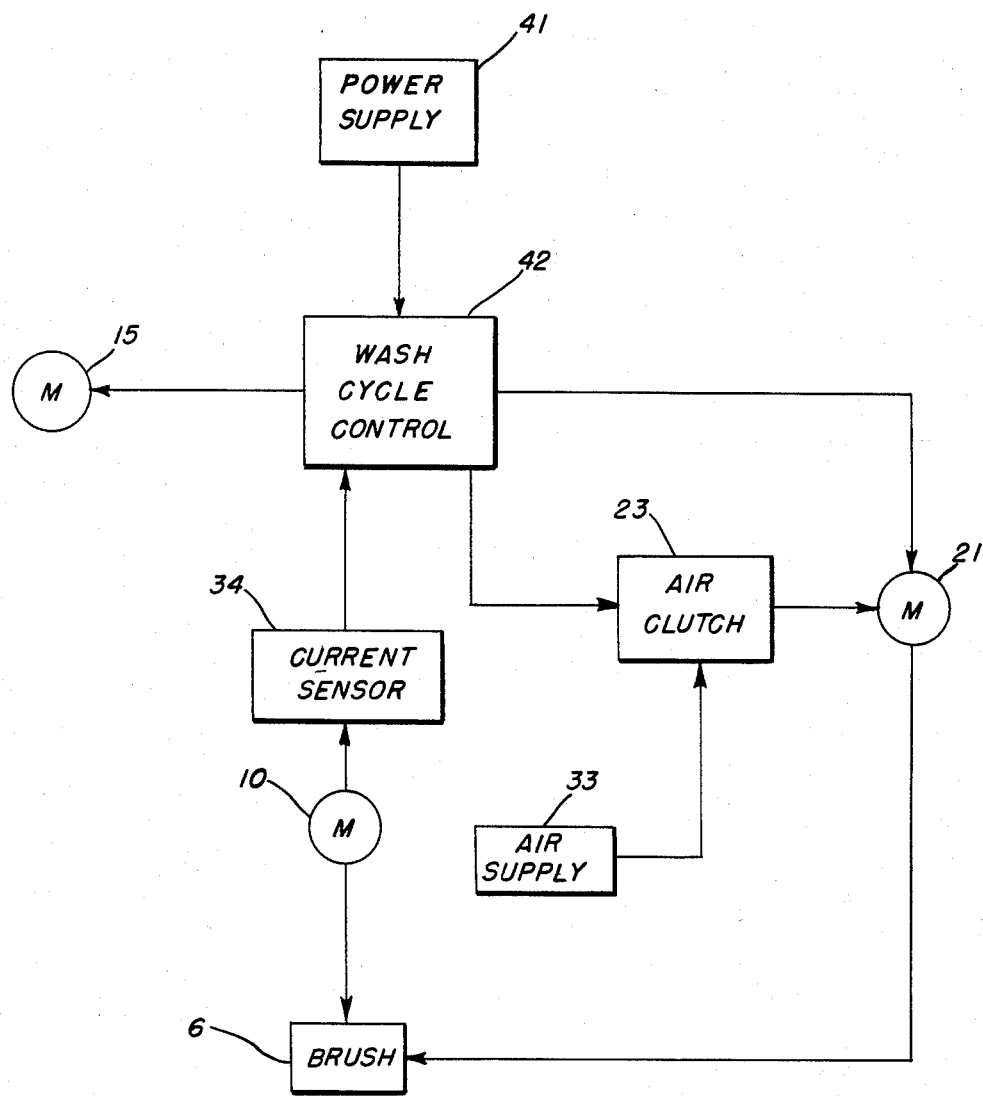
FIG. 2 is a block diagram illustrating the vehicle washing apparatus control system.

Prior to the start of the wash operation, the air clutch is activated, although the related motor is turned off, so as to act as a brake and hold the horizontally positioned cleaning brush at the top of the frame prior to initiation of the cleaning cycle. A vehicle to be washed pulls up to the vehicle washing apparatus 2 and stops. An automatic sensor senses the presence of the vehicle to be washed and initiates the wash cycle of the apparatus. Alternatively, the wash cycle may be initiated manually by pushing the appropriate starting button. Upon initiation of the wash cycle, the air clutch is disengaged and the cleaning brush 6 counterbalanced by weight 14 such that the weight of the brush slightly exceeds the weight of the counterweight descends in a "floating" manner to the bottom of the support frame. The brush mount 9 moves vertically downward in guides provided in the legs 4 of the gantry 2. Once the brush 6 reaches the lowest point of its descent, a limit switch is activated which starts the motor 15 which drives the frame member relative to the vehicle. The gantry moves so as to engage the brush with the lead surface of the vehicle, the brush continuously rotating during the cleaning cycle. When the brush contacts the vehicle, the resistance to the movement of the brush increases so as to slow the revolutions of the brush. As illustrated in FIG. 2, power supply 41 drives the constant speed brush motor 10 so as to maintain the rotational speed of the brush constant. An increase in the resistance to the rotation of the brush triggers an increase in current to maintain the predetermined revolutions per minute (rpm) of the motor 10 constant. This increase in current is sensed by the current sensing device 34 which sends a signal to wash cycle control system 42 which in turn stops the gantry in its forward movement by cutting off power to the motor (M) 15. At the same time, the sensing device 34 sends a signal via the control system to the brush lift motor 21 and an air clutch 23 which receives air from air supply 33 whereby the brush lift motor 21 engages the chain 22 (FIG. 1) so as to lift the brush 6 relieving the resistance encountered by the brush with the vehicle. When the resistance is reduced to a point where the current amperage is decreased to an originally predetermined value while maintaining the rpm's of the brush constant, the motor to the gantry is restarted and the gantry again moves forward relative to the vehicle. Thus, upon activation of the air clutch, the brush mechanism is instantaneously raised which provides for a constant adjustment of the brush relative to the vehicle being cleaned. When the sensing device senses the decrease in amperage to the originally predetermined level, the air clutch is disengaged and the rotating brush allowed to settle or float back into contact with the vehicle. The gantry then continues its movement forward as the cleaning cycle continues. As a result of the configuration or structure of the present invention, the cleaning cycle is intermittently interrupted when the resistance level is such that the amperage is increased in the motor driving the brush which signals the gantry to be halted and the brush raised by the engagement of the means for driving the chain for lifting the brush with the corresponding gear box or transmission. When the means for engaging the lifting chain and the transmission is disengaged upon the return of the amperage to its predetermined level, the brush is maintained at its proper level as a result of the counterbalance 14. As the frame member moves along the length of the vehicle, the horizontal cleaning brush engages the vehicle while continuous adjustments are made in a vertical direction such that the brush continues to contact the cleaning surface until the entire vehicle has been cleaned. Following completion of the cycle, the cleaning brush engages a circuit limit switch 25 which reverses the process and return the entire brush assembly to its original starting position while rinsing the vehicle to complete the cleaning operation.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:
1. A vehicle washing apparatus, comprising:
  a frame member having an opening adapted to receive a vehicle;
  a horizontal cleaning brush rotatable about a horizontal axis of rotation disposed in said frame member;
  contant speed motor means for rotating said brush at a constant speed;
  current sensing means for sensing an increase in current above a predetermined value drawn by said constant speed motor means, said increased current being caused by a greater than desired pressure contact between said brush and said vehicle;
  vertically adjustable mounting means for adjustably mounting said brush in said opening;
  counterweight means for partially counterweighting said brush and said vertically adjustable mounting means wherein said brush naturally descends under the force of gravity and contacts said vehicle being washed, said counterweight means allowing said rotating brush to descend into contact with said vehicle to achieve desired pressure contact between said brush and said vehicle;
  a brush lifting motor responsive to said current sensing means for lifting said vertically adjustable mounting means against the excess weight of said counterweight means when said current exceeds said predetermined value;
  clutch means responsive to said current sensing means for operably connecting said brush lifting motor with said vertically adjustable mounting means, said clutch means being actuated to transmit torque from said brush lifting motor to said vertically adjustable mounting means when said current exceeds said predetermined value; and
  movement means responsive to said current sensing means for causing relative movement in a first horizontal direction between said frame member and said vehicle during a representative cleaning cycle wherein said movement means is actuated when said current is below said predetermined value and said movement means is not actuated when said current is above said predetermined value.
2. The vehicle washing apparatus of claim 1, wherein said frame member comprises a horizontal top portion supported by a pair of lateral leg portions and said frame member is moved in a horizontal direction by said movement means.
3. A vehicle washing apparatus comprising:
  a frame member having an opening adapted to receive a vehicle;
  a horizontal cleaning brush rotatable about a horizontal axis of rotation disposed in said frame member;
  constant speed motor means for rotating said brush at a constant speed;
  current sensing means for sensing an increase in current above a predetermined value drawn by said constant speed motor means, said increased current being caused by a greater than desired pressure contact between said brush and said vehicle;
  vertically adjustable mounting means for adjustably mounting said brush in said opening;
  counterweight means for partially counterweighting said brush and said vertically adjustable mounting means wherein said brush naturally descends under the force of gravity and contacts said vehicle being washed, said counterweight means allowing said rotating brush to descend into contact with said vehicle to achieve desired pressure contact between said brush and said vehicle;
  a brush lifting motor responsive to said current sensing means for lifting said vertically adjustable mounting means against the excess weight of said counterweight means when said current exceeds said predetermined value;
  an air actuated clutch operably connecting said brush lifting motor with said vertically adjustable mounting means, said air clutch being actuated simultaneously with said brush lifting motor by an air supply to transmit torque from said brush lifting motor to said vertically adjustable mounting means when said current exceeds said predetermied value; and
  movement means responsive to said current sensing means for causing relative movement in a first horizontal direction between said frame member and said vehicle during a representative cleaning cycle wherein said movement means is actuated when said current is below said predetermined value and said movement means is not actuated when said current is above said predetermined value.

* * * * *